Dec. 8, 1964     M. F. BEDIL     3,160,838
ELECTRIC TRANSFORMERS
Filed Nov. 9, 1961     4 Sheets-Sheet 1

Inventor:
Mustafa Fahrettin Bedil
By: Stevens, Davis, Miller & Mosher
Attorneys

Dec. 8, 1964   M. F. BEDIL   3,160,838
ELECTRIC TRANSFORMERS
Filed Nov. 9, 1961   4 Sheets-Sheet 4

Inventor:
Mustafa Fahrettin Bedil
By: Stevens, Davis, Miller & Mosher
Attorneys

United States Patent Office 3,160,838
Patented Dec. 8, 1964

3,160,838
ELECTRIC TRANSFORMERS
Mustafa Fahrettin Bedil, Stafford, England, assignor to The English Electric Company Limited, London, England, a British company
Filed Nov. 9, 1961, Ser. No. 151,355
Claims priority, application Great Britain, Nov. 24, 1960, 40,400/60
10 Claims. (Cl. 336—69)

This invention relates to electric transformers having high-voltage windings of the pancake type.

According to this invention, an electric transformer has a high-voltage winding of the pancake type whereof at least one pair of adjacent sections near the high-potential terminal has wound between a plurality of the outer turns of the sections conductors which are insulated from the current path of the winding, the sections of the pair being connected in series near their innermost turns and the conductors wound between the turns of said sections being connected together near their outermost turns.

The term "section" has a particular meaning in the transformer art, as will be readily apparent from the description of the invention.

The invention will now be described with reference to the accompanying drawings, of which:

Figure 1:
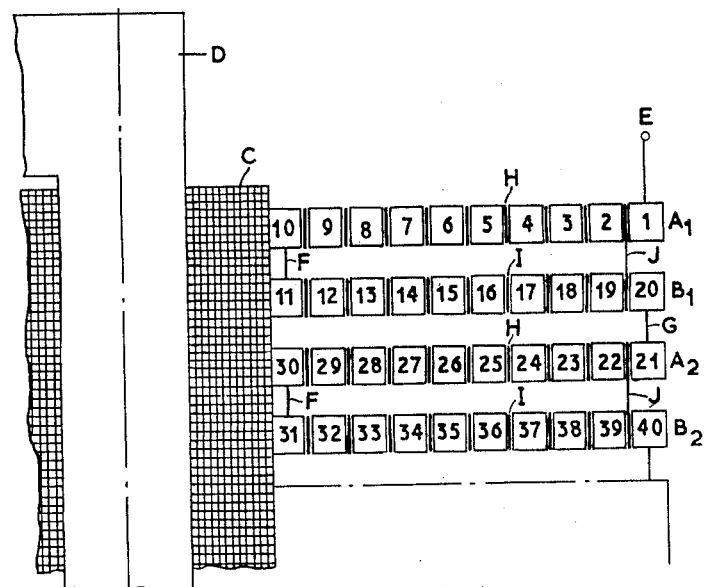
FIG. 1 shows one embodiment of transformer winding in accordance with the invention in which metal foil conductor is wound from between the two outer turns of each section to between the two inner turns.

Referring to FIG. 1 of the drawings, the high-voltage winding of the transformer comprises a number of coils, the first coil consisting of a pair of pancake sections $A_1$, $B_1$, the second coil having a pair of sections $A_2$, $B_2$, and so on. Each coil is wound as an insulated strip conductor surrounding the low-voltage winding C and its surrounding insulation, the low-voltage winding in turn surrounding a limb of the transformer core D.

Successive turns of the inward-spiralling conductor of section $A_1$ are indicated at 1, 2, 3 . . . 10, the outermost turn 1 being directly connected to the high-potential terminal E of the transformer. The second section $B_1$ is similar to section $A_1$, but the conductor spirals outwards, successive turns being indicated at 11, 12, 13 . . . 20. The innermost turn 10 of section $A_1$ is connected to the innermost turn 11 of section $B_1$ by connection F, and the outermost turn 20 of section $B_1$ is connected to the outermost turn 21 of the adjacent section $A_2$ by connection G. It will be understood that one or both of connections F and/or G may consist of the uninterrupted current-carrying conductor itself.

As so far described, the coil sections $A_1$, $B_1$, are constructed and connected to form a single coil of a conventional pancake winding.

In the transformer shown in FIG. 1, however, a metal foil conductor H is wound in interleaved fashion between successive turns of the conductor of the high-voltage winding, and in this embodiment it spirals inward from between the outermost pair of turns 1, 2 of section $A_1$ of the high-voltage winding to between its innermost pair of turns 9, 10, terminating adjacent the end of the inward-spiralling conductor; and likewise a similar foil I spirals outward from between the innermost turns 11, 12 of section $B_1$ to between its outermost pair of turns 19, 20, where it terminates, the two foils H, I, being connected only at their outer parts by the connection J. In the embodiment shown in FIG. 1 a metal foil is provided in both sections of each of the pairs of sections which forms a coil, and it will be noted that no external connection is made to the metal foil. The foil itself is described in greater detail with reference to FIG. 3.

Figure 2:
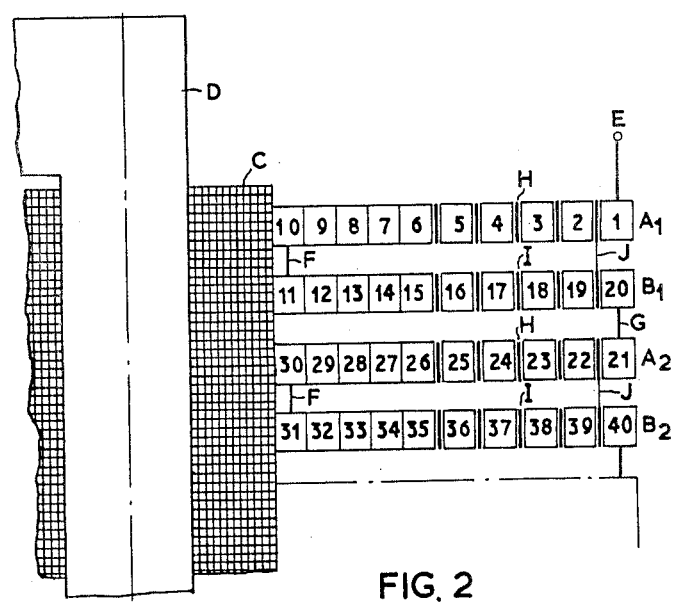
FIG. 2 shows a second embodiment in which the metal foil conductors extend inwardly from between the two outer turns to between the turns 5 and 6.

In FIG. 2 the construction is similar to that of FIG. 1 except that instead of the metal foils H, I, extending inward to between the innermost pair of turns, they extend part way only from between the outermost pairs of turns 1, 2 and 19, 20, terminating for example between turns 5 and 6 in section $A_1$, and turns 15 and 16 in section $B_1$, and between corresponding turns in all the other sections of the high-voltage winding.

Figure 3:
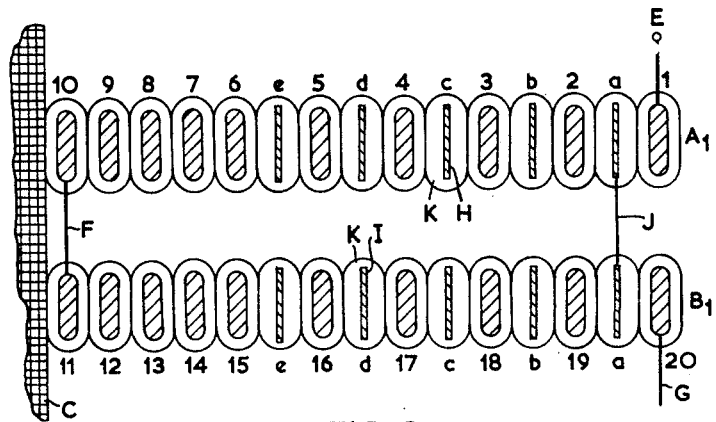
FIG. 3 is a detail of part of FIG. 2 showing one construction of the metal foil conductors.

The section $A_1$, $B_1$, of FIG. 2 are shown in greater detail in FIG. 3, from which one construction of the metal foils H, I, will also be seen. Successive turns of each foil are designated $a$, $b$ . . . $e$, and the foil, which is preferably of copper, is in this example surrounded by an insulating covering K, for example similar to that employed on the conductors; moreover the width (i.e., the dimension between upper and lower edges of the section) of the insulated foil is similar to that of the conductor of the coil section, enabling the latter to be closely and firmly wound. Uninsulated metal foil may be used, in which case the width of the foil will preferably be somewhat less than that of the insulated conductor; the insulated foil is preferred, however, as this improves the flashover and leakage insulation between turns of the foil. Instead of copper, the foil may be of aluminium, or it may be formed by spraying a conducting metal on an insulating carrier. The details of the foil described in relation to FIG. 3 may, of course, be applied to any of the arrangements shown in the other figures.

The purpose and function of the metal foils is to increase the "series capacitance" of the winding, and thus to decrease the tendency for high voltages to build up between turns and between sections when a surge voltage is applied to the high-voltage terminal E of the winding. The metal foil H may be regarded as forming, in conjunction with the adjacent turns of the conductor of section $A_1$, a non-inductively wound condenser having as it terminals the connection J and the connection to the high-potential terminal E, both being at the outside of the spiral coil, and likewise the other metal foils may be regarded as forming similar condensers with the respective conductor parts.

The conventional current-carrying connector G between turn 20 at the outside of section $B_1$, and the first turn at the outside of section $A_2$, also serves to connect these non-inductively wound condensers in series with each other.

Figure 4:
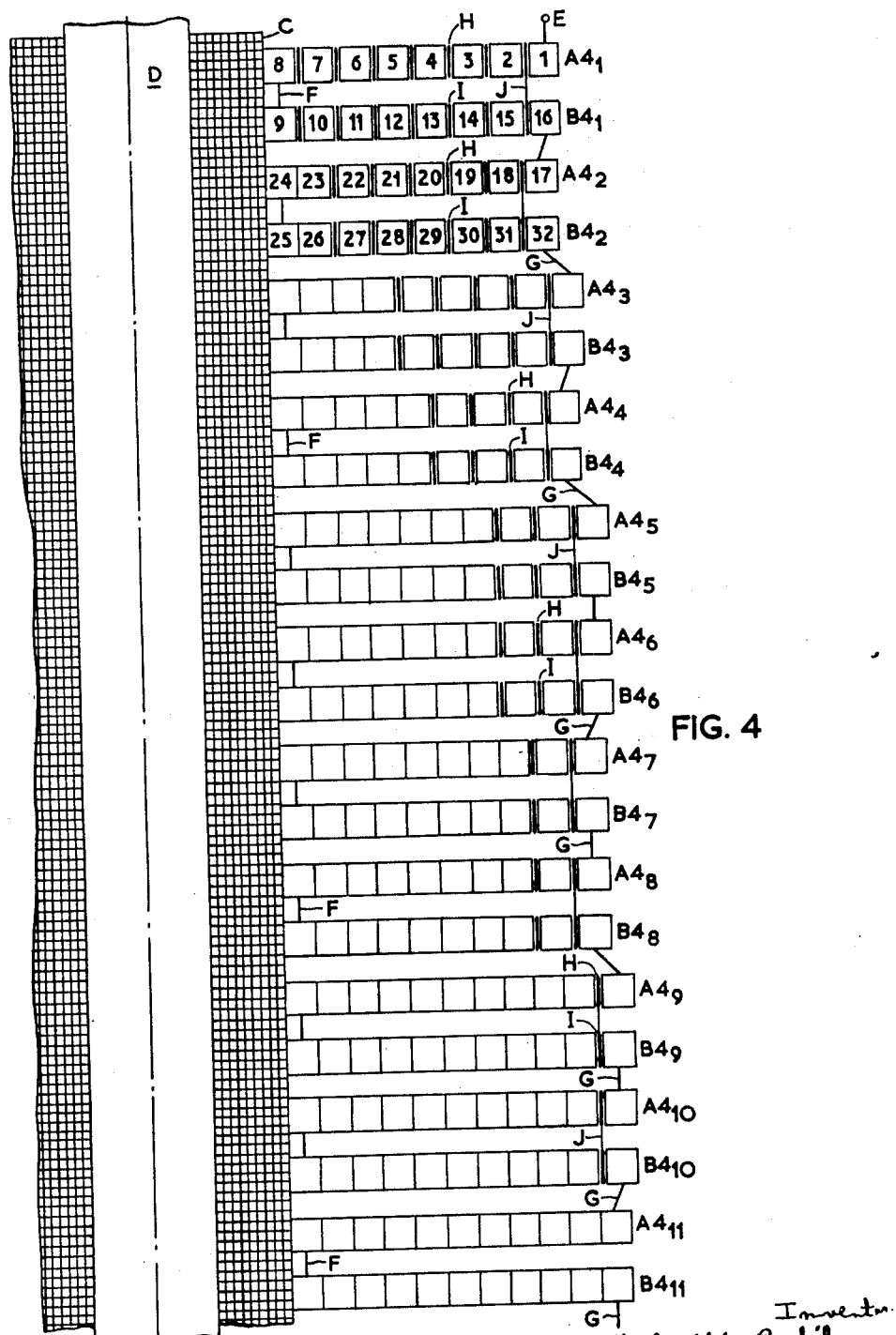
FIG. 4 shows a third embodiment in which a metal foil conductor is reduced progressively from the high potential terminal in the direction of the ground terminal.

It will be appreciated that the potential differences between adjacent turns and between adjacent sections will, in a winding of the type described, be more severe between the outer turns and between the upper sections when a surge voltage is applied to the high-voltage terminal E, since these are nearest to the high-voltage terminal. In the embodiment shown in FIG. 4, therefore, the winding of interleaved metal foil is graduated, and also the number of turns of the conductors in different sections is varied.

In the uppermost coil formed by the pair of sections $A4_1$, $B4_1$, the metal foil is wound, as in the arrangement of FIG. 1, from between the outermost turns to between the innermost turns; however in the next coil $A4_2$, $B4_2$, the metal foil only extends to between the innermost but one pair of turns 22, 23 and 26, 27; in the third coil the metal foil has five turns, in the fourth coil four, in the fifth and sixth coils three, in the seventh and eighth coils two, in the ninth and tenth one, and in the remaining coils none.

The reduction of the number of turns of metal foil permits, if desired, an increase in the number of turns of the conductor within the same diameter, and it will be seen that the first two coils have eight turns of the conductor, the third and fourth have nine, the next four have ten, and from the ninth coil onwards there are eleven turns of the conductor.

Figure 5:
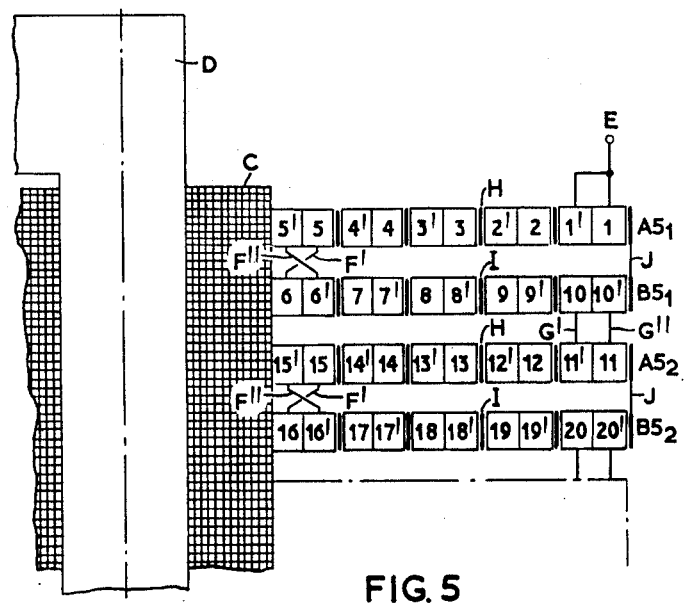
FIG. 5 shows a fourth embodiment in which two parallel current-carrying conductors are shown, with one corresponding arrangement of the metal foil conductors.

In the embodiments hitherto described, each section comprised a single spiral conductor, but the invention may equally be employed where the winding comprises a plurality of conductors wound in parallel. In the arrangement shown in FIG. 5 one conductor of section $A5_1$, is shown at 1, 2 . . . 5 and a parallel conductor is shown at 1', 2' . . . 5'. Likewise in section $B5_1$ the parallel conductors are shown at 6, 7, 8 . . . 10, and 6', 7', 8' . . . 10' respectively. The turns 1, 1' are connected to the high-potential terminal E, turns 5 and 5' are connected respectively to turns 6 and 6' by connections F', F", and the turns 10, 10' are connected to the corresponding outermost turns of section $A5_2$. The metal foil H, I, is in this case wound between turns of the pairs of conductors of the winding.

Figure 6:
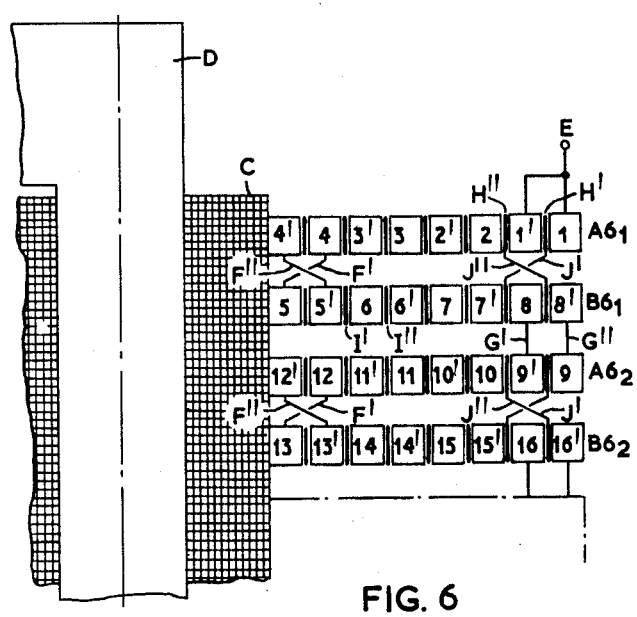
FIG. 6 shows a fifth embodiment in which two parallel current-carrying conductors are shown with another metal foil conductor being used in each section.

An alternative manner of winding the metal foil where a pair of conductors is wound in parallel is shown in FIG. 6. Here a pair of windings of metal foil is used in each section $A6_1$, $B6_1$, one metal foil winding H' in section $A6_1$ separating the turns of one conductor (e.g. 1, 2, 3, 4) from the turns of the parallel conductor 1', 2', 3', 4' and the other metal foil winding H" separating one turn of the pair of parallel conductors from the adjacent turn. The relation between metal foil windings and conductors may be reversed in section $B6_1$, as shown, and then the metal foil windings are preferably interconnected as shown by connections J' and J" respectively.

Thus the winding has both metal foil conductors H", I' wound between the turns of the pair of conductors of the winding, and also conductors H', I" wound between the pair of conductors of a single turn of the winding.

Figure 7:
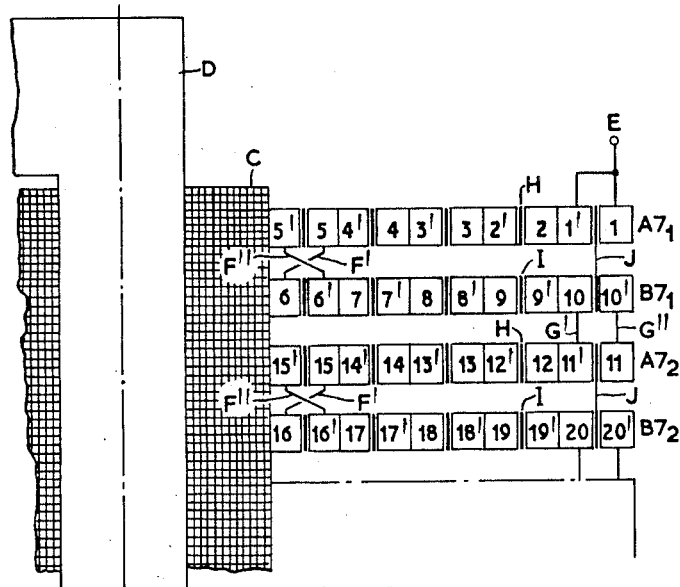
FIG. 7 shows a sixth embodiment of transformer winding in accordance with the invention in which parallel current-carrying conductors are shown having an alternative arrangement of the metal foil conductor.

Another alternative manner in which the metal foil may be wound when parallel conductors are used is shown in FIG. 7. In this case the metal foil H, I, is wound between the two parallel conductors of a single turn of the winding, there being no metal foil between one turn of the pair of parallel conductors and the next.

It will be understood in other respects the transformers having the pairs of conductors wound in parallel are similar to those described earlier having a single conductor. In particular, although in describing the application of the invention to parallel conductors the metal foil winding has been shown as extending from adjacent the outside turn of the conductor to adjacent the inside turn, it will be appreciated that the metal foil may extend only part way towards the inside turn as described in relation to FIG. 2, or may be graduated as described in relation to FIG. 4, when applied to parallel conductors.

The invention can also be applied when parallel conductors are grouped in groups of more than two, in ways analogous to those described above.

Other modifications are possible within the scope of the invention, but it will be appreciated that in each case the metal foil winding will be applied to at least some of the turns of those sections of the winding which are connected in series in the current path of the winding near its high-potential terminal.

The term "metal foil" has been used throughout the specification for convenience, but it will be understood that this term as used in this specification includes not only metal strip of very thin section, which is satisfactory because the metal foil is only required to carry capacitance charging currents and is not connected in the main current path of the winding, but also for example elements of thicker section, and elements formed by spraying a conducting metal on an insulating carrier.

In a modification of the invention, which may be applied to any of the arrangements shown or described, the metal foils H, I of adjacent sections may be connected through external condensers or other electrical impedance means. Such impedance means will thus be included in the connection J shown in the figures.

What I claim as my invention and desire to secure by Letters Patent is:

1. An electric transformer comprising a core, a high-potential terminal and a high-voltage winding, said high-voltage winding comprising a number of coils, each coil comprising a first pancake section including a normally-current-carrying conductor wound in a first plurality of turns forming a first spiral around said core and affording first and second end turns one at each end thereof, a second pancake section including a normally-current-carrying conductor wound in a second plurality of turns forming a second spiral around said core of opposite hand to said first spiral and affording first and second end turns one at each end thereof, a first connection between said first end turns of said first and second pancake sections of each coil, second connections interconnecting each of the adjacent second end turns of adjacent coils to one another and the second end turn of the first pancake section of the first coil to the high-potential terminal; a first non-current-carrying conductor wound together with said current-carrying conductor in one of said first pancake sections and between turns thereof, extending continuously for a plurality of turns, having one end turn coupled capacitively with said second end turn of said first pancake section and having its other end turn free; a second non-current-carrying conductor wound together with said current-carrying conductor in one of said second pancake sections and between turns thereof, extending continuously for a plurality of turns, having one end turn coupled capacitively with said second end turn of said second pancake section and having its other end turn free; and a third connection between said one end turns of said first and second non-current-carrying conductors, whereby a substantially wholly capacitative path is provided between the high-potential terminal and a coil spaced therefrom.

2. An electric transformer as claimed in claim 1 wherein a said first non-current-carrying conductor is wound together with said current-carrying conductor in each of said first pancake sections, and wherein a said second non-current-carrying conductor is wound together with said current-carrying conductor in each of said second pancake sections.

3. An electric transformer as claimed in claim 1 wherein said other end turn of each said first non-current-carrying conductor is capacitively coupled with said first end turn of each said first pancake section, and said other end turn of each said second non-current-carrying conductor is capacitively coupled with said first end turn of each said second pancake section.

4. An electric transformer as claimed in claim 1 wherein each said first pancake section affords an intermediate turn between its first and second end turns, each said second pancake section affords an intermediate turn between its first and second end turns, said other end turn of each said first non-current-carrying conductor is capacitively coupled with a said intermediate turn of a said first pancake section, and said other end turn of each said second non-current-carrying conductor is capacitively coupled with a said intermediate turn of a said second pancake section.

5. An electric transformer comprising a core, a high-potential terminal, and a high-voltage winding, said high-voltage winding comprising a number of coils, each coil comprising a first pancake section including a normally-current-carrying conductor wound in a first plurality of turns forming a first spiral around said core, a second pancake section including a normally current-carrying conductor wound in a second plurality of turns forming a second spiral around said core and a first connection from one end of said first spiral to the corresponding end of said second spiral; said transformer further comprising a first non-current-carrying conductor wound together with said current-carrying conductor in each of a plurality of said first sections and between turns thereof and extending continuously for a plurality of turns, a second non-current-carrying conductor wound together with said current-carrying conductor in each of a plurality of said second sections and between turns thereof and extending continuously for a plurality of turns, and second connections between said first and second non-current-carrying conductors, said second connections being remote from said first connections, wherein the number of turns of said non-current-carrying conductors is graduated, the non-current-carrying conductors having a larger number of turns in the pancake sections near the high-potential terminal than in the pancake sections further from the high-potential terminal.

6. An electric transformer as claimed in claim 5 wherein said non-current carrying conductors extend inward to between the innermost pair of turns in the pair of adjacent sections nearest to the high-potential terminal.

7. An electric transformer as claimed in claim 5 wherein the number of turns of the sections of the high-voltage winding is greater in those sections remote from the high-potential terminal than in those sections adjacent to the high-potential terminal.

8. An electric power transformer comprising a core, a high-potential terminal, and a high-voltage winding, said high-voltage winding comprising a number of coils, each coil comprising a first pancake section including a normally-current-carrying conductor wound in a first plurality of turns forming a first spiral around said core and affording first and second end turns one at each end thereof, a second pancake section including a normally-current-carrying conductor wound in a second plurality of turns forming a second spiral around said core of opposite hand to said first spiral and affording first and second end turns one at each end thereof, a first connection between said first end turns of said first and second pancake sections of each coil, second connections interconnecting each of the adjacent second end turns of adjacent coils to one another and the second end turn of the first pancake section of the first coil to the high-potential terminal; first non-current-carrying conductors wound together with said current-carrying conductors in said first pancake sections and between turns thereof, extending continuously for a plurality of turns, each having one end turn coupled capacitively with said second end turn of said first pancake section and having its other end turn free; second non-current-carrying conductors wound together with said current-carrying conductors in said second pancake sections and between turns thereof, extending continuously for a plurality of turns, each having one end turn coupled capacitively with said second end turn of said second pancake section and having its other end turn free; the number of turns of said first and second non-current-carrying conductors being a maximum in said first coil connected to the high-potential terminal, said number of turns being a minimum in a final coil remote from the high-potential terminal, and said number of turns varying in coils between said first coil and said final coil and not exceeding said maximum and not being reduced below said minimum; and third connections between said one end turns of said first and second non-current-carrying conductors, whereby a substantially wholly capacitative path is provided between the high-petential terminal and said final coil spaced therefrom.

9. An electric transformer as claimed in claim 8, wherein said other end turn of the first non-current-carrying conductor of said first coil is capacitively coupled with the first end turn of the first pancake section of said first coil, and said other end turn of the second non-current-carrying conductor of said first coil is capacitively coupled with the first end turn of the second pancake section of said first coil.

10. An electric transformer as claimed in claim 8, wherein the number of turns of said normally-current-carrying conductor of said first and second pancake sections is greater in said final coil than in said first coil.

References Cited in the file of this patent
UNITED STATES PATENTS

| 217,466 | Leconte | July 15, 1879 |
| 2,710,380 | De Buda | June 7, 1955 |
| 2,905,911 | Kurita | Sept. 22, 1959 |

FOREIGN PATENTS

| 206,033 | Austria | Nov. 10, 1959 |